(12) United States Patent
Avnery et al.

(10) Patent No.: US 7,704,460 B2
(45) Date of Patent: Apr. 27, 2010

(54) GAS SEPARATION DEVICE

(75) Inventors: Tzvi Avnery, Winchester, MA (US); Jonathan Nord, Beverly, PA (US)

(73) Assignee: Advanced Electron Beams, Inc., Wilmington, MA (US)

( * ) Notice: Subject to any disclaimer, the term of this patent is extended or adjusted under 35 U.S.C. 154(b) by 1818 days.

(21) Appl. No.: 10/768,968

(22) Filed: Jan. 30, 2004

(65) Prior Publication Data

US 2006/0260928 A1    Nov. 23, 2006

Related U.S. Application Data

(60) Provisional application No. 60/444,917, filed on Feb. 3, 2003.

(51) Int. Cl.
*B01J 19/08*    (2006.01)
(52) U.S. Cl. ..................................... 422/186
(58) Field of Classification Search ............ 422/186.03, 422/186
See application file for complete search history.

(56) References Cited

U.S. PATENT DOCUMENTS

| | | | |
|---|---|---|---|
| 4,414,082 A | 11/1983 | Neary et al. | |
| 4,943,356 A | 7/1990 | Dietrich | |
| 5,015,349 A | 5/1991 | Suib et al. | |
| 5,131,993 A | 7/1992 | Suib et al. | |
| 5,409,784 A | 4/1995 | Bromberg et al. | |
| 5,430,207 A | 7/1995 | Keck | |
| 5,744,067 A | 4/1998 | Jahnke | |
| 5,929,286 A | 7/1999 | Krumpelt et al. | |
| 6,187,226 B1 | 2/2001 | Detering et al. | |
| 6,210,562 B1 | 4/2001 | Xie et al. | |
| 6,245,309 B1 | 6/2001 | Etievant et al. | |
| 6,331,283 B1 | 12/2001 | Roy et al. | |
| 6,395,197 B1 | 5/2002 | Detering et al. | |
| 6,451,174 B1 | 9/2002 | Burkitbaev | |
| 6,482,368 B2 * | 11/2002 | Hemingway et al. | ... 422/186.04 |
| 2002/0104435 A1 | 8/2002 | Baker et al. | |
| 2002/0125173 A1 | 9/2002 | Kuno | |
| 2002/0151604 A1 | 10/2002 | Detering et al. | |
| 2002/0177745 A1 | 11/2002 | Bullock | |

FOREIGN PATENT DOCUMENTS

JP    11 278802 A    10/1999

(Continued)

OTHER PUBLICATIONS

"Novel Micro-Fuel Processor," InnovaTek website, http://www.tek-kie.com/nmfp.htm, downloaded Sep. 6, 2002.

(Continued)

*Primary Examiner*—Kishor Mayekar
(74) *Attorney, Agent, or Firm*—Hamilton, Brook, Smith & Reynolds, P.C.

(57) ABSTRACT

A gas separation apparatus includes an irradiation chamber for receiving a gas. An irradiation device irradiates the gas within the irradiation chamber for causing molecules of the gas to break apart into larger and smaller constituent components. A separation arrangement separates the larger and smaller constituent components from each other within the irradiation chamber by forcing the larger and smaller constituent components toward different regions of the irradiation chamber. An outlet removes the smaller constituent components from the irradiation chamber.

20 Claims, 6 Drawing Sheets

FOREIGN PATENT DOCUMENTS

| WO | WO 93/11855 A1 | 6/1993 |
|---|---|---|
| WO | WO 02/26378 A1 | 4/2002 |

OTHER PUBLICATIONS

Nice, K., "How Fuel Cells Work," http://www.howstuffworks.com/fuel-cell2.htm, downloaded Sep. 6, 2002.

Nice, K., "How Fuel Processors Work," http://www.howstuffworks.com/fuel-processor.htm, downloaded Sep. 6, 2002.

"Thermal Cracking of Used Oil to Produce Distillate Gasoil," by Don Kress, President, Par Excellence Developments, Inc., Sudbury, Canada.

"Thermal Cracking," http://www.svce.ac.in/PetroleumTech/Unit/ThermalCracking, downloaded Dec. 30, 2002.

Freudenrich, C.C., "How Oil Refining Works," http://www.howstuffworks.com/oil-refining.htm, downloaded Dec. 30, 2002.

Geissler, K., et al., "Kinetics and Systems Analysis for Producing Hydrogen from Methanol and Hydrocarbons."

* cited by examiner

US 7,704,460 B2

GAS SEPARATION DEVICE

RELATED APPLICATION

This application claims the benefit of U.S. Provisional Application No. 60/444,917, filed Feb. 3, 2003. The entire teachings of the above application are incorporated herein by reference.

BACKGROUND

Gas separation can be performed by a number of different methods such as employing gas adsorbent materials, filtration through membranes, refrigeration techniques, etc. The cost and speed of the gas separation varies with each technique. One application of interest is the separation of hydrogen from hydrogen bearing gases, for example, a hydrocarbon gas such as natural gas or methane. The separated hydrogen can be employed in fuel cells or for combustion.

SUMMARY

The present invention employs an irradiation device for breaking apart and separating gases. The present invention includes a gas separation apparatus having an irradiation chamber for receiving a gas with a rotary member capable of rotating about an axis. An irradiation device irradiates the gas for causing molecules of the gas to break apart into larger and smaller mass constituent components. Rotation of the rotary member causes the larger mass constituent components to move radially outwardly relative to the axis of the rotary member and the smaller mass constituent components. A first outlet is positioned near the axis of the rotary member for removing the smaller mass constituent components.

In preferred embodiments, a second outlet is positioned radially outwardly from the rotary member for removing the larger mass constituent components. The irradiation device is an electron beam device for irradiating the gas with an electron beam. A first collection unit is connected to the first outlet for collecting the smaller mass constituent components. A second collection unit is connected to the second collection unit for collecting the larger mass constituent components. A recirculating passageway recirculates some components back into the irradiation chamber with a recirculating pump. A gas source is connected to the reaction chamber by an inlet passageway. The rotary member includes a series of radially extending partitions.

The present invention also includes a gas separation apparatus having an irradiation chamber for receiving gas. An irradiation device irradiates the gas within the irradiation chamber for causing molecules of the gas to break apart into larger and smaller mass constituent components. A waveform generator separates the larger and smaller mass constituent components from each other. A first outlet removes the smaller mass constituent components.

In preferred embodiments, a second outlet removes the larger mass constituent components. The irradiation device is an electron beam device for irradiating the gas with an electron beam. The waveform generator provides a cyclic bi-directional time variant electric field which can extend between first and second regions.

The present invention is also directed to a gas separation apparatus having an irradiation chamber for receiving a gas. An irradiation device irradiates the gas within the irradiation chamber for causing molecules of the gas to break apart into larger and smaller mass constituent components. A separation arrangement separates the larger mass and smaller mass constituent components from each other within the irradiation chamber by forcing the larger mass and smaller mass constituent components toward different regions of the irradiation chamber. A first outlet removes the smaller mass constituent components from the irradiation chamber.

In preferred embodiments, a second outlet removes the larger mass constituent components from the irradiation chamber. Typically, the irradiation device is an electron beam device for irradiating the gas with an electron beam. In one embodiment, the separation arrangement includes a rotary member capable of rotating about an axis. Rotation of the rotary member causes the larger mass constituent components to move radially outwardly to the axis of the rotary member and the smaller mass constituent components. In another embodiment, the separation arrangement includes a waveform generator for separating the smaller mass constituent components from the larger mass constituent components. In further embodiments, the smaller mass constituent components include $H^+$ ions which are reacted with oxygen in a reaction chamber that is in communication with the first outlet. Electrons are conveyed from the irradiation chamber to the reaction chamber by an electrical connection therebetween to aid the reaction. An electrical device can be electrically connected to the electrical connection and driven by the electrons. A proton conducting device can be included for extracting protons from the irradiation chamber.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
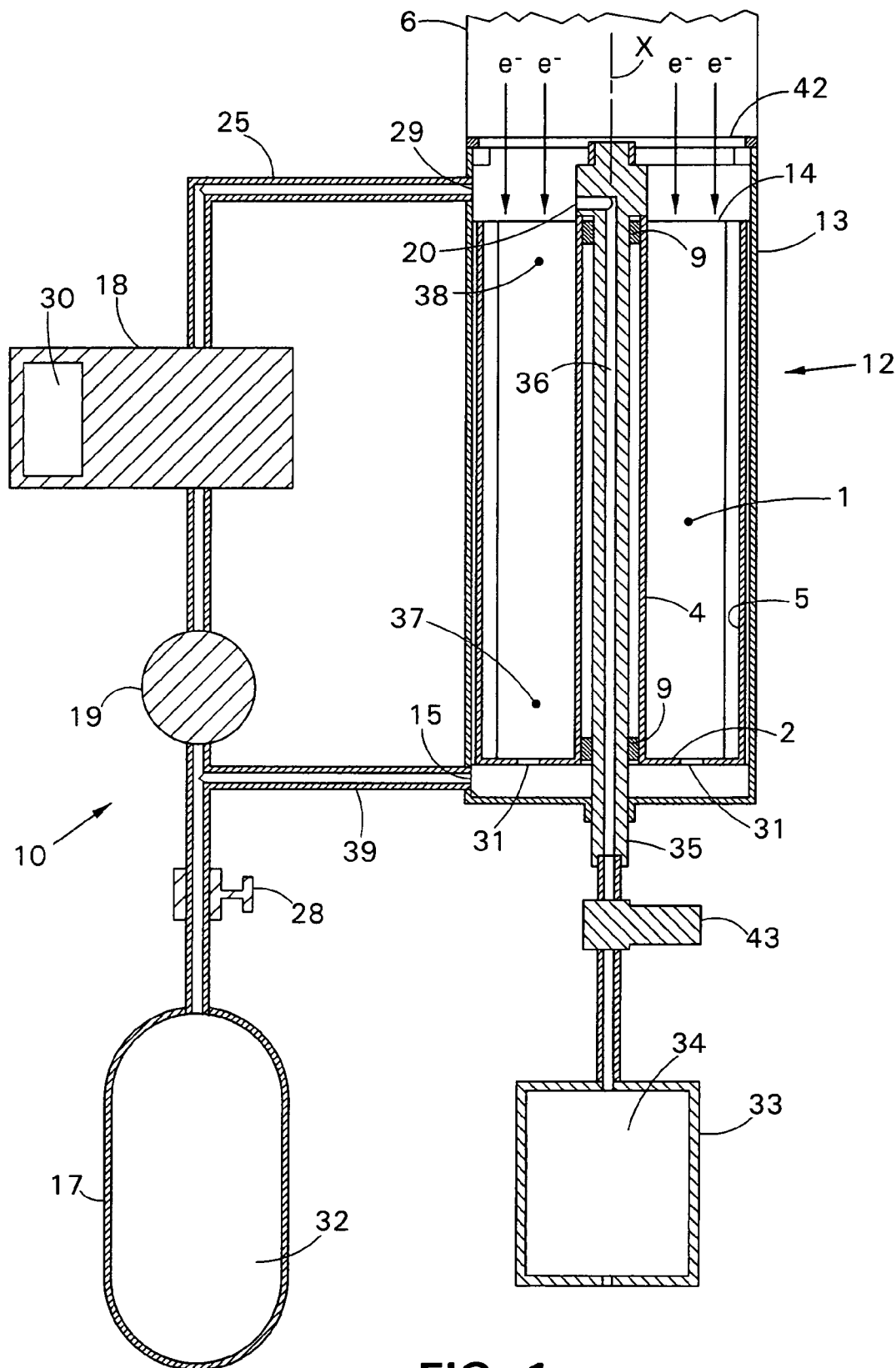
FIG. 1 is a schematic drawing of an embodiment of the present invention gas separation device.
Figure 2:
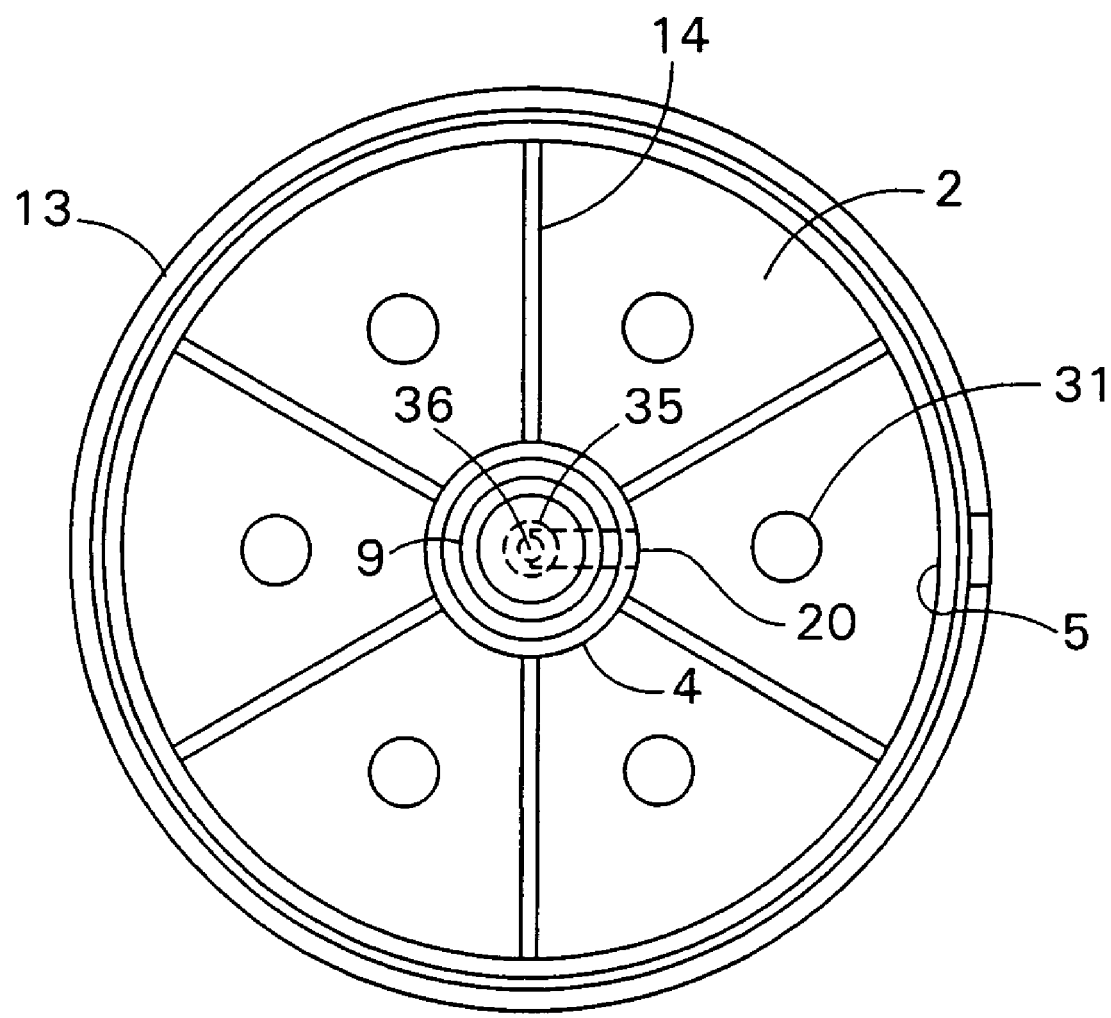
FIG. 2 is a top sectional view of the irradiation chamber.

Referring to FIGS. 1 and 2, gas separation apparatus 10 breaks apart and separates gases 32 employing fragment ion separation together with virtual forces resulting from acceleration, which can be performed using centrifugation. FIG. 1 depicts an embodiment that combines centrifugation with an electron beam emitter 6.

The gas separation apparatus 10 includes a gas container 17 for storing an input target gas 32. A separation or irradiation chamber 12 having a rotary member or core 1 with fluid stabilizing partitions 14 receives the target gas 32. Electrons $e^-$ emitted from the electron beam emitter 6 in an electron beam are directed into the irradiation chamber 12 through electron beam emitter exit window foil 42 and break the target gas 32 into fragment ions of disparate masses consisting of larger and smaller mass constituent molecular components which are then separated in the irradiation chamber 12. A collection reservoir or container unit 33 collects the smaller mass constituent components 34 and a collector unit 18 collects a portion of the larger mass constituent components 30, for example, carbon (C), filtered by a filter in collector unit 18. The smaller constituent components are lower in mass or less massive than the larger constituent components, which are more massive or greater in mass. Typically, the smaller or less massive components are also smaller in size than the larger or more massive components.

Radial acceleration of the target gas 32, for causing inertial forces, occurs inside a rotating container within the irradiation chamber 12 referred to as the rotary member or core 1. The boundaries of the core 1 are defined by the floor 2, the inner wall 4, and the outer wall 5, each typically having a constant radius about the core axis X. The core 1 rotates about a shaft 35 on bearings 9. The shaft 35 is fixed in the base of cylindrical core container 13. Core rotation can be accomplished by fashioning the outer core walls to behave as either an induction or permanent magnet machine rotor. Likewise, the inner faces of the core container could be fashioned in a compatible manner, resulting in a radial flux machine.

Control of the input target gas 32 fed from the input target gas container 17 can be accomplished by actuating the input target gas valve 28. Target gas 32 passing the valve 28 enters the core container 1 through the feed conduit 39 and the target gas main feed port 15. Due to tight spacing that exists between the core outer wall 5 and the container wall 13, a majority of the input target gas 32 will enter the rotating core through its target gas core feed ports 31.

Upon passage through one of the target gas core feed ports 31, the gas 32 enters a specific core sector whose boundaries are defined by fluid stabilizing partitions 14. As target gas 32 continues to enter through the core feed ports 31, a general flow toward the top 38 of the rotating core 1 is established. Gas traveling toward the top 38 of the core enters the vicinity of 37 where the cloud of high velocity electrons e⁻ dissociates the incoming gas 32 molecules into fragment ions or constituent molecular components.

The chemical properties of the input target gas 32 and the energy and number of incident electrons e⁻ will determine the mass and charge of the fragment ions or constituent components. When separating hydrogen from hydrocarbon molecules, fragment ions that are not fully atomized will typically be at least about twelve or thirteen times as massive or greater in mass as the hydrogen.

Some minimum level of rotational uniformity (gas particles rotating at a uniform angular frequency equal to that of the rotating core) must be attained to minimize disturbances in the otherwise uniform radial inertial force on the rotating particles that can be shown to be: $F=mr\omega^2$. Therefore, for a fixed radial position, fragmented ions that have not been fully atomized (fragmented ionic molecules), the more massive or larger mass constituent components, will experience at least about thirteen times the inertial force as atomized hydrogen ions, or less massive or smaller mass constituent components.

The general flow up the core 1 through the full electron e⁻ cloud depth results in successive fragmentation of the target gas 32 and its ionic fragments. During this movement and fragmentation, the force differential causes ionic molecules, and carbon, to move toward the outer wall, displacing hydrogen back toward the center.

It should be noted that fragmentation of the input target gas 32 results in expansion of the gas mixture such that, although the mass flow rates are the same, the volumetric flow rate at the top of the core 1 will be substantially greater than at the bottom of the core 1. As the fragments move near the top of the core 1, the rotational flow field stabilizes and the quantity of displaced atomized hydrogen against the inner wall 4 increases.

Before surpassing the top of the core sector, the atomized hydrogen against the inner wall enters a stationary scoop or inlet 20. The inlet 20 is set well below or above the upper bound of the fluid stabilizing partition designed to minimize its disturbance on the gaseous fragment mixture rotating in the core 1. Flow of the smaller constituent components 34 into the inlet 20 and through conduit 36 to collection reservoir or container unit 33 is regulated by valve 43.

The more massive molecular fragments or larger constituent components which slide along the outer wall 5 and out the top of the core 1 are drawn out of the space between fluid stabilizing partitions 14 and the electron beam emitter foil 42 through inlet 29 by the recirculation pump 19. This reduces the back pressure which could lead to unwanted disturbances near the inlet 20. Gas that happens to leak through the space between the core 1 and core container 13 will ultimately be collected at the inlet 29.

The fragment ion composition of the gas entering the inlet 29 will typically be a function of the molecular structure of the input target gas 32 and the effectiveness of the dose of high velocity electrons e⁻ received while traveling to the top. Therefore, the dose affects the concentration of atomized fragments in the gas entering the inlet 29. Fragments entering inlet 29, will inevitably contain some less massive atoms or smaller constituent components along with the sought mixture of more massive fragments or larger constituent components. As this fragment mixture travels down conduit 25, some portion of the more massive fragments or larger constituent components 30 are filtered out by collector unit 18 for routine removal.

Fragments collected by the inlet 29 are mostly more massive molecular and atomic fragments or larger constituent components, along with a small portion of less massive fragments. The less massive atomic fragments or smaller constituent components will pass through the filter of collector unit 18 and join the input target gas 32 stream in the feed conduit 39. In this way, some portion of the larger constituent components are removed from the process while the smaller constituent components are reprocessed by recirculation.

For most target gases 32 of interest here, a solid atomized more massive fragment or larger constituent component is sought for removal while both more massive fragment molecules and the less massive smaller constituent component fragments remain gaseous. The process used by collector unit 18 can exploit this distinguishing feature.

In one embodiment, electron beam emitter 6 is a hermetically sealed unit operating in the range of about 70-150 kV, with about 100 kV being common. However, depending upon the situation, electron beam emitter 6 can be operated below 70 kV or above 150 kV. Electron beam emitter 6 can be mounted to the irradiation chamber 12 in a manner where the exit window foil 42 of electron beam emitter 6 is perpendicular to core axis X and directly exposed to the interior of irradiation chamber 12. The exit window foil 42 can be titanium, or titanium that is coated with materials having high thermal conductivity for more rapidly conducting heat therefrom. When gas separation apparatus 10 is employed in situations where the contents within irradiation chamber 12 can be reactive or corrosive, the high thermal conductivity material is preferably corrosion resistant, for example, gold or diamond. The exit window foil can be similar to those described in U.S. patent application Ser. No. 10/103,539, filed Mar. 20, 2002, the entire contents being incorporated herein by reference. Electron beam emitter 6 can be similar to those described in U.S. Pat. No. 6,407,492, issued Jun. 18, 2002 and U.S. patent application Ser. No. 09/209,024, filed Dec. 10, 1998, the entire contents being incorporated herein by reference. Alternatively, in other embodiments, more than one electron beam emitter 6 can be mounted to irradiation chamber 12. In addition, electron beam emitter 6 does not have to be hermetically sealed, instead being evacuated by a vacuum pump during operation.

A number of derivatives of this technique can be employed by exploiting the electrostatic charge that fragments exhibit following electron impact ionization. Two direct extensions of the centrifuge embodiment using Lorenz and Coulomb forces, respectively, can be employed. Lorenz forces are exerted on the charged particle moving in a magnetic field. Coulomb forces are exerted on a charged particle in an electric field regardless of particle velocity. Both of these methods offer a technique whereby each of the individual fragment species may be separated from each other during rotation inside the core. This removes the need for pump 19 and a collection filter. Furthermore, excited molecular fragments remain under electron impact until fully atomized rather than being recirculated where energy may be dissipated in the form of heat.

For separation of fragment ions using a combination of the radial inertial force produced by centrifugation and a Lorenz force, a magnetic field directed parallel to the core axis should exist throughout the core cross section. In such a case, either permanent or electromagnets can be positioned above and below the rotating core. Depending on the radial gradient and the overall field strength required, the aspect ratio and shape of the apparatus may be different.

For separation of fragment ions using a combination of the radial inertial force produced by centrifugation and a Coulomb force, a radially directed electric field should exist throughout the core cross section. Inner and outer core walls typically act as electrodes and the partitions are nonconductive. Depending on the radial gradient and the overall field strength required, the aspect ratio and shape of the apparatus may be different. Additional electrodes within the core may also be employed.

The Lorenz/Coulomb force is linear with particle charge. Likewise, the inertial force is linear with particle mass. The Lorenz/Coulomb force is directed against the inertial force. As a result, species travel at a radial position where the inertial force and the Lorenz/Coulomb force sum to zero. If all fragments had equal charge, the fragments would line up radially in order of increasing fragment mass. However, the charge of fragment ions depends on the chemical properties of the target gas and the electron impact sustained.

Therefore, the charge range of atomized fragment ions should be known. For instance, if C can ionize to have a charge of up to 3+, then three different scoops or inlets are typically placed in the core 1. In a similar manner, it is possible that two different species may assume a nearly identical radial equilibria. As an example, a fragment with atomic mass 12 and charge 2+ would rotate in the same radial position as a mass of 6 with a charge of 1+.

Typically, the inlet 20 is at the end of a small stationary conduit 36 extending from the shaft 35 and protruding through the core inner wall 4. An scoop, for gathering the more massive atomic ions or larger constituent components, extends from the surface of the partition 14 to ensure that unwanted fragments are not swept into the scoop as they slide toward equilibrium. The scoop leads to a conduit extending along the partition and then up the core outer wall to the top of the core 1. More massive atomic ions or larger constituent components exit the conduit into the void above the core 1 and enter the inlet 29. As in the centrifuge case, the design typically ensures that lower pressure exists in both the container 17 and the container 33.

Figure 3:
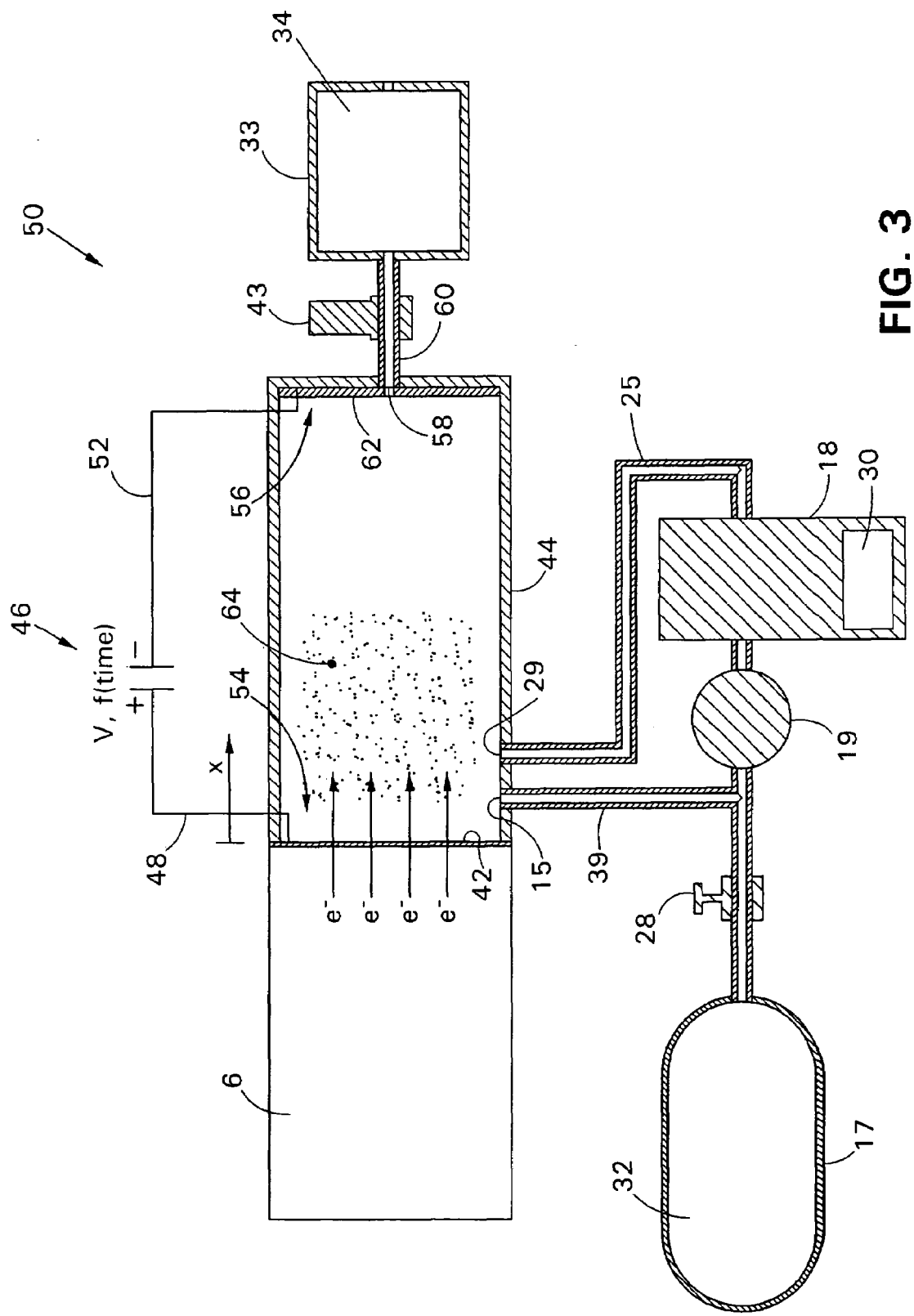
FIG. 3 is a schematic drawing of another embodiment of the present invention gas separation device.

Referring to FIG. 3, gas separation apparatus 50 includes a gas container 17 for storing an input target gas 32. The gas container 17 is connected to a core which serves as a separation or irradiation chamber 44 via input target gas valve 28, feed conduit 39, and feed port 15 for supplying irradiation chamber 44 with the target gas 32. Electron beam emitter 6 is mounted to irradiation chamber 44 typically in a sealed manner for directing elections $e^-$ through electron beam exit window foil 42 and into the irradiation chamber 44 for irradiating the target gas 32. A waveform generator 46 is electrically connected via lines 48 and 52 to first 54 and second 56 regions of the irradiation chamber 44 that are spaced apart or separated from each other. The second region 56 is the collection destination for the smaller mass constituent components with inlet 58 positioned at this location for such collection. In the embodiment depicted in FIG. 3, the first 54 and second 56 regions are located at the left and right end walls of irradiation chamber 44, but alternatively, can be positioned away from the walls or in a different orientation. The collection reservoir or container unit 33 for collecting the smaller mass constituent components or less massive atomic ion fragments 34 is connected to irradiation chamber 44 by inlet 58, conduit 60 and valve 43. Conduit 25 having inlet 29 is connected to irradiation chamber 44 at one end and joins conduit 39 at the other end. Collector unit 18 having a collection filter is connected to conduit 25 and collects a portion of larger mass constituent components or more massive ion fragments 30 in collector unit 18. A recirculation pump 19 connected to conduit 25 can be included for facilitating recirculation of uncollected constituent components back into reaction chamber 44 via conduit 39.

In operation, electrons $e^-$ impacting target gas 32 in separation or irradiation chamber 44 ionizes input target gas molecules, forming a variety of fragment ion species or constituent components. The fragment ion composition is dependant on the properties of the target gas molecule. For example, propane, $C_3H_8$, can ionize into fragments such as $C_3H_8^+$ or $C_2H_5^+$ and $CH_3$ or $C_2H_4^+$ and $CH_4$. Under continued electron impact these fragments further ionize into a myriad of $C_xH_y^{z+}$ molecular ions of various molecular formulae (as indicated by x, y) and net charge (z). Due to the propensity of electron impact to eject electrons from the target molecules, often chemical bonds are broken. Typically, straight chain alkanes break at the C-C bonds first, followed by the C-H bonds releasing $H^+$ ions (protons). When the C-H bond in a diatomic molecule is broken, C ions are also released. When separating hydrogen from hydrocarbon gases, typically, the less massive atomic fragment ions or smaller constituent components are H ions. The larger constituent components can include more massive atomic ions such as C ions, which can be in combination with other atoms. The larger constituent components can also include intermediate molecules.

When the target gas 32 is a straight chain alkane, electron impact fragments will typically be positively charged $C_xH_y$ molecules. The mass differential between ions containing C or larger constituent components, and atomized H ions or smaller constituent components, is that molecules containing at least one C atom will be at least about twelve or thirteen times as massive or greater in mass as atomized H ions.

In the irradiation chamber 44 of separation apparatus 50, a cyclic bi-directional time variant electric field is applied such that ion displacement is dependent on charge to mass ratio. Differential coulomb displacement of less massive atomic ions or smaller constituent compounds, versus more massive atomic ions and molecules or larger constituent components containing the more massive elements, is utilized to create a space and time where less massive atomic ions or smaller constituent components may be collected. In distinguishing displacement of individual ion species, the starting position of the ion at the beginning of each cycle should be known with reasonable accuracy. One method of accounting for the starting location and displacement of each ion is accomplished by constraining the starting location and placing ion pickups a known distance from the constrained starting location.

The electric field between regions 54 and 56 is established by electrically connecting waveform generator 46 via line 48 to the first region 54 at one side of the irradiation chamber 44, and to electrode 62 at the second region 56 via line 52 at another side of the irradiation chamber 44. The exit window foil 42 of the electron beam emitter 6 can be electrically connected to line 48 to act as the ground electrode. Alternatively, lines 48 and 52 can be electrically connected to grids positioned within irradiation chamber 44 inwardly from the walls. Waveform generator 46 provides cyclic repulsion, collection, and attraction waveforms between regions 54 and 56 to displace, retain less massive atomic ions or smaller constituent compounds for collection, and reset the larger fragment ions or larger constituent components back to the starting location.

Control of the target gas 32 feed from the target gas container 17 is accomplished by actuating the input target gas valve 28. Target gas 32 passing the valve 28 enters the irradiation chamber 44 through the feed conduit 39 and the target gas core feed port 15. Target gas 32 entering reaction chamber 44 diffuses into the irradiation chamber 44 and is ionized by high velocity electrons e⁻ in the area that constitutes the electron cloud 64. Until the target gas 32 molecules become ionized, typically, only the action of diffusion and interaction with moving ions will affect molecule movement. In order to ensure that only less massive atomic fragments or smaller constituent components reach the electrode 62 and inlet 58 at the right wall or region 56, target gas 32 molecules should be ionized prior to defusing past the electron cloud 64. This can be accomplished by adjusting the dose provided by the electron cloud 64 and the feed rate of the target gas 32.

The ion starting position is typically related to the electron cloud 64 depth and cyclic displacement resulting from repulsion and attraction pulses. Ions may form at any time, at any location within the electron cloud 64 depth. By managing ion displacement with repulsion and attraction periods, ion starting locations can be restricted to the electron cloud region 64. Repulsion and attraction pulses should provide a cyclic net displacement that is in a negative x direction. If the cyclic net displacement is in the positive x direction, ion starting positions can move toward the electrode 62 in region 56 at the right and thereby move out of the electron cloud region 64.

Figure 4:
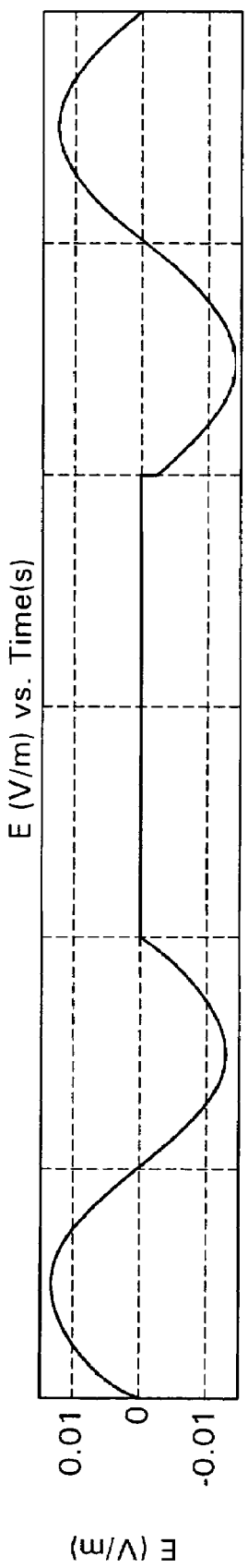
FIG. 4 is a graph depicting an electric waveform generated by the waveform generator.
Figure 5:
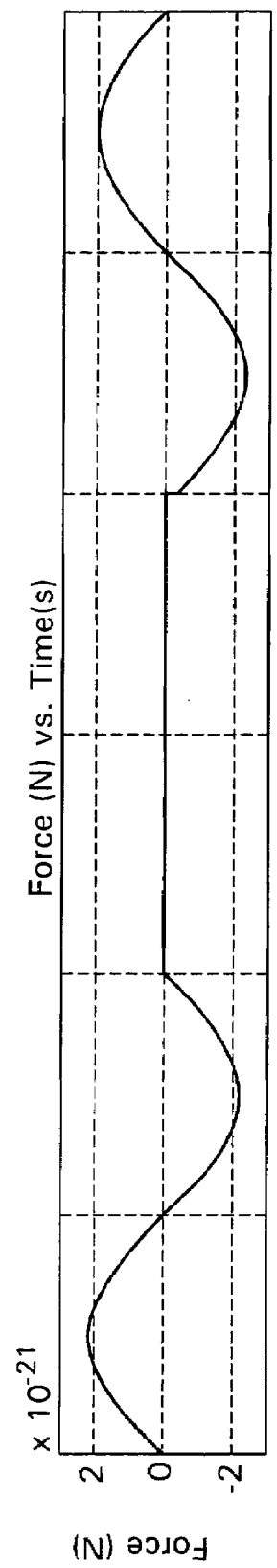
FIG. 5 is a graph depicting the force exerted by the waveform of FIG. 4.

The ion dynamics within the irradiation chamber 44 is typically accomplished in three stages; repulsion, collection, and attraction periods. An example of operating electrical waveforms for each of these periods is shown in FIG. 4. Each period is 1 ms occurring in the order mentioned above. In the E vs. Time plot depicted in FIG. 4, the electric field is based on the electric fields found in irradiation chamber 44 with a dimension of 20 cm between the exit window foil 42 or the left wall and the electrode 62 or the right wall. Waveforms for the Force vs. Time plot exerted by such an electric field are shown in FIG. 5 and calculated from the particle charges (each +1 in this example) and the electric field strength.

Figure 6:
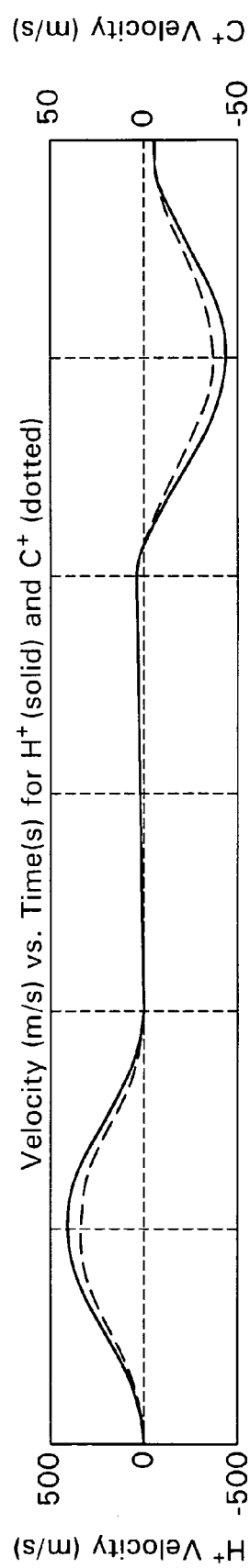
FIG. 6 is a velocity graph depicting the relative velocities for $H^+$ and $C^+$ ions caused by the waveform of FIG. 4.
Figure 7:
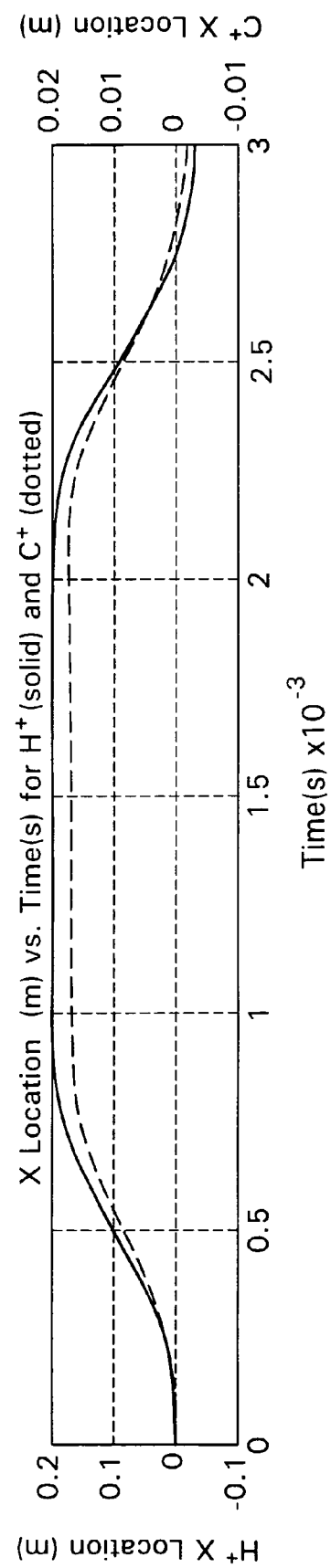
FIG. 7 is a displacement graph depicting the relative displacement for $H^+$ and $C^+$ ions caused by the waveform of FIG. 4.

In this example, referring to FIGS. 6 and 7, the repulsion period occurs between 0 and 1 ms displacing fragments in the positive x direction. The more massive fragments or larger constituent components lag behind the less massive fragments or smaller constituent components by a factor equal to the ratios of the two masses (for fragments of equal charges) until the less massive fragments reaches the right wall at which time the period ends. The DC component of the voltage repulsion waveform is zero such that particles begin and end with the same velocity, dissipating energy lost in the form of drag.

The collection period, occurring between 1 and 2 ms, begins when less massive ions or smaller constituent components reach the removal destination at region 56 at the electrode 62 on the right wall, and ends prior to the arrival of more massive fragments or larger constituent components. During collection, a constant repulsion voltage is provided that is sufficient to hold the desired ions at region 56 for collection without causing significant acceleration of more massive ions. C+ ion displacement during the collection period is minimal due to absorption of fragment kinetic energy during the second half of the repulsion period and the judicious application of Coulomb force required for fragment collection during the collection period. Collection of the less massive atomic fragments by inlet 58 is controlled by the inlet valve 43 and a motive force pushing atomic fragments from the irradiation chamber 44 into collection reservoir 33.

If the irradiation chamber 44 operates at a pressure greater than the collection reservoir 33, a valve may be required to regulate flow. In such a case, the inlet valve 43 opens during the collection period and allows less massive atomic ions or smaller constituent components 34 to flow into collection reservoir 33.

Alternatively, a mechanical pump or a coulomb force pump could be employed to facilitate movement of the smaller constituent component ions from a lower pressure irradiation chamber 44 to higher pressure collection reservoir 33. In this case, a mechanical pump may double as a valve to prevent collected ions from returning to the irradiation chamber 44 during the following attraction and repulsion periods. Similarly, it is conceivable that a coulomb force pump could use an electric field to exert force during ion collection to overcome the pressure differential and equal the pressure during the repulsion and attraction periods to contain the ions already collected. However, when using a coulomb pump as a valve, the collected fragments typically must remain ionized. Any pumping would occur during the collection period and a valve action would be used during the attraction and repulsion periods.

In the event that it is possible for target gas 32 as well as more massive fragment ions or larger constituent components to reach the removal destination at region 56, a valve becomes necessary. In such a case, regardless of the pressure gradient between the core or irradiation chamber 44 and the collection reservoir 33, during the repulsion period incoming less massive fragments could displace unwanted molecules from the region 56 such that at the end of the repulsion period when the valve opens, only less massive atomic ions are present at the inlet 58 for collection.

In the event that only less massive atomic fragments or smaller constituent components reach the region 56, continuous operation of a pump or no valve in the positive pressure gradient case could provide a simple and cost effective solution if the associated pumping action or pressure differential does not interfere with the repulsion, collection, and attraction dynamics.

During the attraction period, ions are attracted toward the grounded exit window foil 42 of the electron beam emitter 6 at region 54. The attraction period reverses the direction of the ions to avoid the possibility of the larger fragment ions or larger constituent components from reaching the inlet 58. The attraction period in one example occurs between 2 and 3 ms displacing fragment ions in the negative x direction. With the exception of the decaying negative DC component included to ensure negative net fragment displacement, the attraction period is similar to the repulsion period. The ions end the attraction period with negative velocity and negative net displacement for the cycle. Negative net displacement and remaining velocity at the end of each full cycle will accumulate until it results in fragment collision with the foil 42 at the left wall of region 54 at the end of each attraction period, in which case the left wall becomes the fragment ion starting position. In this manner, ion starting location is constrained to the electron cloud region 64.

For fragment particles of mass and charge other than those used above, amplitudes of the velocity and displacement waveforms will be scaled by $Q'*12/M'$ and $Q'*1/M'$ for the $C^+$ and $H^+$ waveforms, respectively, where $Q'$ and $M'$ are the charge and mass of the fragment of interest. Fragments containing C cannot take on a charge sufficient to cause displacement similar to those of $H^+$.

As fragments oscillate left and right between regions 54 and 56, less massive atomic ions or smaller constituent components are removed during the collection periods, increasing the ratio of more massive atomic ions and molecules containing the more massive element to less massive fragments in the electron cloud region 64. Furthermore, due to repetitive ionization of more massive fragments while in the electron cloud 64, the species entering the recirculation inlet 29 are predominantly more massive atomic ions. Although it is possible for molecules containing the more massive element and even less massive atomic ions to enter the recirculation inlet 29, the collector unit 18 has a filter which removes only the more massive atomic ions 30 for collection in collector unit 18. The remaining species are returned to the irradiation chamber 44 through the feed conduit 39 by the recirculation pump 19. This allows all species to be fully ionized and separated.

Voltage waveforms during the repulsion, collection, and attraction periods are employed in providing differential displacement, collection, and starting location management. The electron cloud 64 depth and its percentage of the overall distance between the left and right walls or regions 54 and 56 as a function of fragment mass and charge, ending velocity and collection time, can be optimized to achieve the desired balance of less massive fragment throughput and electromechanical efficiency.

Ionization can occur at any time within the electron cloud 64. Displacement from the foil 42 or region 54 of an ion during the repulsion period is dependant on not only the mass of the ion but also its location prior to ionization and timing of the ionization relative to the duration of the repulsion period. Therefore, electron impact ions produced at the edge of the electron cloud at the beginning of the repulsion period start nearer and will travel toward the right wall or region 56. The depth of the electron cloud 64 and the amplitude and duration of the repulsion pulse can be adjusted to ensure that larger constituent components such as carbon and molecules containing carbon do not reach the right wall or region 56 under these conditions. Similarly, ions formed at the edge of the electron cloud 64 can be drawn back to the designated cyclic starting position by the attraction pulses. It is possible that target gas 32 molecules may diffuse through the electron cloud 64 without ionizing and continue to diffuse to the right wall or region 56. Ionization and cyclic displacement can overcome the less predictable effects of diffusion and interspecies interaction.

Reduced pressure can be used in the irradiation chamber 44 to reduce the effects of fragment molecule drag in comparison to the coulomb forces. By reducing fragment drag by maintaining a very low core pressure, the cyclic frequency can increase. However, because the available mass processing capacity in the irradiation chamber is proportional to the ambient pressure, less ions will be processed during each cycle.

In embodiments where reduced pressure is used in the irradiation chamber 44 during the separation process, removing smaller constituent components such as hydrogen ions to higher pressure regions can be accomplished by employing a proton conducting device such as a proton exchange membrane. Also, proton conducting materials can be suitable for providing the seal or barrier required to maintain the lower pressure.

Figure 8:
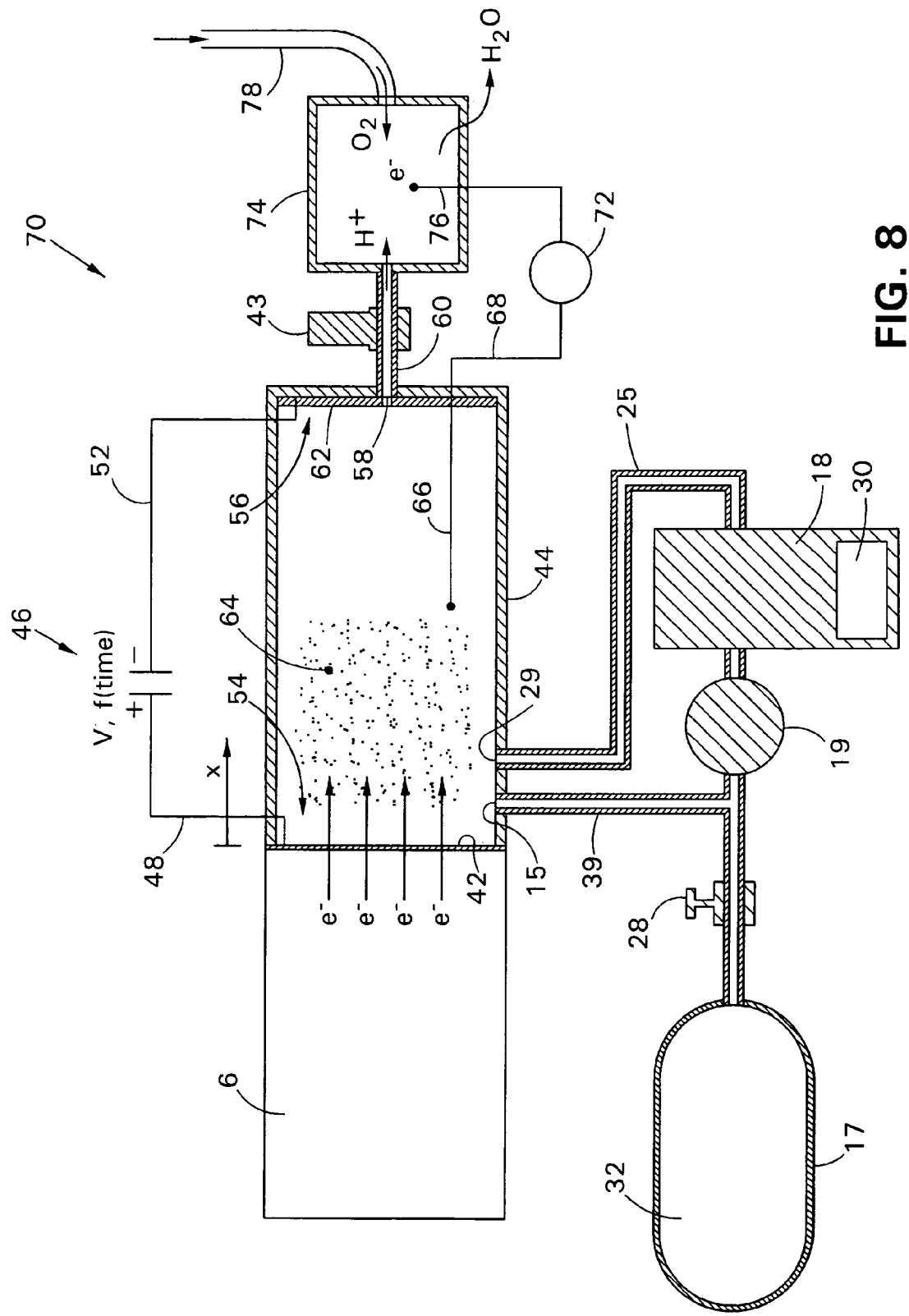
FIG. 8 is a schematic drawing of yet another embodiment of the present invention gas separation device.

Referring to FIG. 8, gas separation apparatus 70 differs from apparatus 50 shown in FIG. 3 in that gas separation apparatus 70 includes a reaction cell or chamber 74 where $H^+$ ions are reacted with oxygen entering by conduit 78 to form water. An electrode 66 is positioned within irradiation chamber 44 and is electrically connected to electrode 76 within reaction chamber 74 by line 68. Electrons are drawn from irradiation chamber 44 to reaction chamber 74 via line 68 and electrode 76 to provide the electrons necessary for reacting the $H^+$ ions with the oxygen. Applying electrical insulation between the chamber 74 and irradiation chamber 44 ensures that electrons are conducted through line 68. An electrical device 72 can be electrically connected to line 68. Device 72, for example, can be a battery that is recharged by electrons traveling between electrodes 66 and 76, or an electric motor, heating coil, lighting, transformer, etc., powered by the electrons. Other embodiments of the present invention, for example, the apparatus 10 depicted in FIG. 1 can also be modified to include reaction chamber 74, electrodes 66 and 76, line 68, device 72 and conduit 78.

An electric vehicle can be operated with such an arrangement with the electrical device 72 being an electrical motor for powering the vehicle. The electrical motor can be electrically connected to a battery which also becomes recharged by the electrons traveling between electrodes 66 and 76. The $H^+$ ions can be used on demand so that supply tanks for storing hydrogen prior to entrance in reaction chamber 74 can be omitted if desired. In addition, by supplying $H^+$ ions into reaction chamber 74, a proton exchange membrane is not required for purposes conducting only protons.

While this invention has been particularly shown and described with references to preferred embodiments thereof, it will be understood by those skilled in the art that various changes in form and details may be made therein without departing from the scope of the invention encompassed by the appended claims. For example, although the present invention has been described for separating hydrogen from hydrocarbon gas, it is understood that the present invention can be employed for separating a variety of other gases. In addition, features of different embodiments of the present invention can be combined or omitted. Although the irradiation device employed in the present invention is typically an electron beam emitter for generating an electron beam, in some cases, other irradiation devices can be employed for irradiating the separation or irradiation chamber with other suitable types of radiation, such as microwave, radio frequency, laser radiation, etc. The irradiation devices do not have to be mounted directly to the irradiation chamber. Furthermore, although terms such as left and right have been used to describe the present invention in the orientation shown in the figures, such terms are not meant to limit the orientation of the present invention or its components. In some cases, a second outlet is not employed for removing the larger constituent components. A single outlet can be configured to remove the smaller and larger constituent components at different times, or the larger constituent components can remain in the irradiation chamber.

What is claimed is:

1. A gas separation apparatus comprising:
   an irradiation chamber for receiving a gas;
   an electron beam device for irradiating the gas with an electron beam within the irradiation chamber for causing molecules of the gas to break apart into larger and smaller constituent components;
   a separation arrangement for separating the larger and smaller constituent components from each other within the irradiation chamber by forcing the larger and smaller constituent components toward different regions of the irradiation chamber, the separation arrangement including a rotary member capable of rotating about an axis, rotation of the rotary member for causing the larger constituent components to move radially outwardly relative to the axis of the rotary member and the smaller constituent components;
   a first outlet for removing the smaller constituent components from the irradiation chamber; and
   a second outlet for removing the larger constituent components from the irradiation chamber.

2. The apparatus of claim 1 in which the smaller constituent components comprise $H^+$ ions, the apparatus further comprising a reaction chamber in communication with the first outlet for reacting the $H^+$ ions with oxygen.

3. The apparatus of claim 2 further comprising an electrical connection between the irradiation chamber and the reaction chamber for conveying electrons from the irradiation chamber to the reaction chamber.

4. The apparatus of claim 3 further comprising an electrical device electrically connected to said electrical connection and driven by said electrons.

5. The apparatus of claim 1 further comprising a proton conducting device for extracting protons from the irradiation chamber.

6. A gas separation apparatus comprising:
   an irradiation chamber for receiving a gas;
   an electron beam device for irradiating the gas with an electron beam within the irradiation chamber for causing molecules of the gas to break apart into larger and smaller constituent components;
   a separation arrangement for separating the larger and smaller constituent components from each other within the irradiation chamber by forcing the larger and smaller constituent components toward different regions of the irradiation chamber, the separation arrangement including a waveform generator for separating the smaller constituent components from the larger constituent components;
   a first outlet for removing the smaller constituent components from the irradiation chamber; and
   a second outlet for removing the larger constituent components from the irradiation chamber.

7. A gas separation apparatus comprising:
   an irradiation chamber for receiving a gas, the irradiation chamber including a rotary member capable of rotating about an axis;
   an irradiation device for irradiating the gas within the irradiation chamber for causing molecules of the gas to break apart into larger and smaller constituent components, rotation of the rotary member for separating the larger and smaller constituent components from each other within the irradiation chamber by forcing the larger and smaller constituent components toward different regions of the irradiation chamber, and causing the larger constituent components to move radially outwardly relative to the axis of the rotary member and the smaller constituent components; and
   a first outlet positioned near the axis of the rotary member for removing the smaller constituent components.

8. The apparatus of claim 7 further comprising a second outlet positioned radially outwardly from the rotary member for removing the larger constituent components.

9. The apparatus of claim 8 in which the irradiation device is an electron beam device for irradiating the gas with an electron beam.

10. The apparatus of claim 9 further comprising a first collection unit connected to the first outlet for collecting the smaller constituent components.

11. The apparatus of claim 10 further comprising a second collection unit connected to the second outlet for collecting the larger constituent components.

12. The apparatus of claim 11 further comprising a recirculating passageway for recirculating some components back into the irradiation chamber.

13. The apparatus claim 12 further comprising a recirculating pump for recirculating said components.

14. The apparatus of claim 7 further comprising a gas source connected to the reaction chamber by an inlet passageway.

15. The apparatus of claim 7 in which the rotary member includes a series of radially extending partitions.

16. A gas separation apparatus comprising:
    an irradiation chamber for receiving a gas;
    an irradiation device for irradiating the gas within the irradiation chamber for causing molecules of the gas to break apart into larger and smaller constituent components;
    a waveform generator for separating the larger and smaller constituent components from each other within the irradiation chamber by forcing the larger and smaller constituent components toward different regions of the irradiation chamber; and
    a first outlet for removing the smaller constituent components.

17. The apparatus of claim 16 further comprising a second outlet for removing the larger constituent components.

18. The apparatus of claim 17 in which the irradiation device is an electron beam device for irradiating the gas with an electron beam.

19. The apparatus of claim 16 in which the waveform generator provides a cyclic bi-directional time variant electric field.

20. The apparatus of claim 19 in which the cyclic bi-directional time variant electric field extends between first and second regions.

* * * * *

UNITED STATES PATENT AND TRADEMARK OFFICE
CERTIFICATE OF CORRECTION

PATENT NO. : 7,704,460 B2  Page 1 of 1
APPLICATION NO. : 10/768968
DATED : April 27, 2010
INVENTOR(S) : Tzvi Avnery and Jonathan Nord It is certified that error appears in the above-identified patent and that said Letters Patent is hereby corrected as shown below:

On the first page
Field (75), please delete inventor Jonathan Nord's city of residence shown as "Beverly" and insert --Hershey--.

Signed and Sealed this

Twenty-ninth Day of June, 2010

David J. Kappos
*Director of the United States Patent and Trademark Office*